US012620174B2

(12) United States Patent
Shetty et al.

(10) Patent No.:  US 12,620,174 B2
(45) Date of Patent:       May 5, 2026

(54) RECONSTRUCTION OF A 3D MESH OF A PERSON

(71) Applicant: Siemens Healthcare GmbH, Erlangen (DE)

(72) Inventors: Karthik Shetty, Erlangen (DE); Annette Birkhold, Stuttgart (DE)

(73) Assignee: Siemens Healthineers AG, Forchheim (DE)

( * ) Notice: Subject to any disclaimer, the term of this patent is extended or adjusted under 35 U.S.C. 154(b) by 262 days.

(21) Appl. No.: 18/243,796

(22) Filed: Sep. 8, 2023

(65) Prior Publication Data

US 2024/0087230 A1     Mar. 14, 2024

(30) Foreign Application Priority Data

Sep. 12, 2022     (EP) ..................................... 22195196

(51) Int. Cl.
*G06T 17/20*          (2006.01)
*G06T 7/73*           (2017.01)

(52) U.S. Cl.
CPC ................ *G06T 17/20* (2013.01); *G06T 7/75* (2017.01)

(58) Field of Classification Search
None
See application file for complete search history.

(56) References Cited

U.S. PATENT DOCUMENTS

| | | | | |
|---|---|---|---|---|
| 2013/0063436 A1* | 3/2013 | Li | ........................... | G06T 15/08 |
| | | | | 345/423 |
| 2013/0129230 A1* | 5/2013 | Shotton | ................... | G06T 17/00 |
| | | | | 382/218 |
| 2015/0104096 A1* | 4/2015 | Melax | ....................... | G06T 7/75 |
| | | | | 382/154 |
| 2017/0316582 A1* | 11/2017 | Chen | ...................... | H04N 23/66 |

OTHER PUBLICATIONS

Kabsch, Wolfgang. "A solution for the best rotation to relate two sets of vectors." Acta Crystallographica Section A: Crystal Physics, Diffraction, Theoretical and General Crystallography 32.5 (1976): 922-923.
Karthik Shetty et al: "PLIKS: A Pseudo-Linear Inverse Kinematic Solver for 3D Human Body Estimation", arxiv.org, Cornell University Library, 201 Olin Library Cornell University. (Nov. 21, 2022), XP091374942. pp. 1-17.
Kipf, Thomas N., and Max Welling. "Semi-supervised classification with graph convolutional networks." arXiv preprint arXiv:1609.02907 (2017). pp. 1-14.

(Continued)

*Primary Examiner* — Sultana M Zalalee
(74) *Attorney, Agent, or Firm* — Lempia Summerfield Katz LLC

(57)               ABSTRACT

A 3D mesh of a person shall be reconstructed based on one single 2D image. For this purpose, 2D vertex projections and 3D vertex projections of the person are predicted based on the single 2D image. An approximated pose is estimated from the 3D vertex projections. The shape and/or pose, i.e. the 3D mesh of the person, is computed from the predicted 2D vertex projections and from the approximated pose by using a pregiven camera model and an articulated 3D mesh model of a human body.

20 Claims, 2 Drawing Sheets

(56)                    References Cited

OTHER PUBLICATIONS

Kocabas, M., Huang, C. H. P., Tesch, J., Muller, L., Hilliges, O., & Black, M. J. (2021). SPEC: Seeing people in the wild with an estimated camera. In Proceedings of the IEEE/CVF International Conference on Computer Vision (pp. 11035-11045).

Kolotouros, Nikos, et al. "Learning to reconstruct 3D human pose and shape via model-fitting in the loop." Proceedings of the IEEE/CVF international conference on computer vision. 2019. pp. 1-10.

Li, Jiefeng, et al. "Hybrik: A hybrid analytical-neural inverse kinematics solution for 3d human pose and shape estimation." Proceedings of the IEEE/CVF conference on computer vision and pattern recognition. 2021. pp. 3382-3392.

Lin, Kevin, Lijuan Wang, and Zicheng Liu. "Mesh graphormer." Proceedings of the IEEE/CVF international conference on computer vision. 2021. pp. 1-15.

Loper, Matthew, et al. "SMPL: A skinned multi-person linear model." Seminal Graphics Papers: Pushing the Boundaries, vol. 2. 2023. 851-866.

Moon, Gyeongsik, and Kyoung Mu Lee. "I2l-meshnet: Image-to-lixel prediction network for accurate 3d human pose and mesh estimation from a single rgb image." In Computer Vision—ECCV 2020: 16th European Conference, Glasgow, UK, Aug. 23-28, 2020, Proceedings, Part VII 16, pp. 752-768. Springer International Publishing, 2020.

Shapovalov, R., Novotny, D., Graham, B., Labatut, P., & Vedaldi, A. (2021). DensePose 3D: Lifting canonical surface maps of articulated objects to the third dimension. In Proceedings of the IEEE/CVF International Conference on Computer Vision (pp. 11729-11739).

Sun, Ke, Bin Xiao, Dong Liu, and Jingdong Wang. "Deep high-resolution representation learning for human pose estimation." In Proceedings of the IEEE/CVF conference on computer vision and pattern recognition, pp. 5693-5703. 2019.

* cited by examiner

RECONSTRUCTION OF A 3D MESH OF A PERSON

CROSS REFERENCE TO RELATED APPLICATIONS

This application claims the benefit of EP 22195196.5 filed on Sep. 12, 2022, which is hereby incorporated by reference in its entirety.

FIELD

Embodiments relate to reconstruction of a 3D mesh of a person.

BACKGROUND

Estimating human surface meshes and poses from single images is one of the core research directions in computer vision, allowing for multiple applications in computer graphics, robotics and augmented reality. However, since this is essentially an ill-posed problem, since humans have complex body articulations and unknown scene parameters may be represented, this is a challenging task.

This problem has become somewhat more tractable thanks to parametric models such as SMPL and SMPL-X, that represent various human poses and identities using only a few parameters (compare Matthew Loper, Naureen Mahmood, Javier Romero, Gerard Pons-Moll, and Michael J. Black; SMPL: A skinned multi-person linear model; ACM Trans; Graphics (Proc. SIGGRAPH Asia), 34(6):248:1-248: 16, October 2015).

Most state-of-the-art methods like that described in Nikos Kolotouros, Georgios Pavlakos, Michael J Black, and Kostas Daniilidis; Learning to reconstruct 3d human pose and shape via model-fitting in the loop; in ICCV, 2019 directly regress the shape and pose parameters from a given input image. These approaches rely completely on neural networks, even though the mapping between the parameters and the mesh is non-linear while also making several assumptions on the image generation process. One of the factors lies in the use of a simplified camera model i.e. the weak perspective camera. In this scenario the camera is assumed to be far from the subject, that is generally realized by setting a large focal length constant for all images. This weak camera may be modeled by three parameters, two with respect to translation in the horizontal and vertical directions, and the third being scale. While these methods may estimate plausible shape and pose parameters, it becomes a struggle for the networks to optimize between the 2D re-projection loss and the 3D loss, resulting in meshes often being misaligned either in the 3D space or the image space.

On the other hand, recent non-parametric or model-free approaches (compare Kevin Lin, Lijuan Wang, and Zicheng Liu; Mesh Graphormer; 2021 IEEE/CVF International Conference on Computer Vision (ICCV), pages 12919-12928, 2021) directly regress the mesh vertex coordinates with their 2D projections, aligning well to the input image. However, even these methods suffer from the same obstacles as the parametric models by ignoring the effects of a perspective camera.

The paper Ke Sun, Bin Xiao, Dong Liu, and Jingdong Wang; Deep high-resolution representation learning for human pose estimation; in CVPR, 2019 discloses a human pose estimator HRNet-W32.

A mesh regressor is shown in Gyeongsik Moon and Kyoung Mu Lee; I21-meshnet: Image-to-pixel prediction network for accurate 3d human pose and mesh estimation from a single rgb image; ArXiv, abs/2008.03713, 2020.

A graph convolution network (GCN) is described in Thomas N. Kipf and Max Welling; Semi-Supervised Classification with Graph Convolutional Networks; in Proceedings of the 5th International Conference on Learning Representations, ICLR '17, 2017.

W. Kabsch; A solution for the best rotation to relate two sets of vectors; Acta Crystallographica Section A, 32(5): 922-923, 1976 presents an Approximate Rotation Estimator (ARE).

In interventional settings, a patient model may streamline clinical workflow, help optimize radiation dose, and optimize C-arm trajectories and patient positioning. For all of these tasks a patient model that fits the actual patient as precise as possible is required. Especially poses of patients may vary between procedures or may change during a procedure.

Most current camera-based methods, estimate 2D/3D key points on the patient body or regress the shape/pose parameters while assuming in both cases a fixed camera with a very large focal length (i.e., weak perspective camera). This results in unrealistic depth estimation and pose estimation. Further, these methods provide no options to add any known constraints of the environment.

BRIEF SUMMARY AND DESCRIPTION

The scope of the present disclosure is defined solely by the claims and is not affected to any degree by the statements within this summary. The present embodiments may obviate one or more of the drawbacks or limitations in the related art.

Embodiments provide a method and a device for improved reconstruction of a 3D mesh of a person based on one single 2D image of the person.

Embodiments provide a method of reconstructing a 3D mesh of a person including the step of providing one single 2D image of the person. A human being is represented as a 3D mesh. Such a 3D mesh simplifies further data processing, where the pose or shape of the person is essential. The first step of the method is to provide one single 2D image. The single 2D image may be provided in a memory. The image may be gathered by a camera or other imaging devices. One single 2D image is sufficient for the method and no further 2D image of the person is necessary.

In a step of the method, 2D vertex projections and 3D vertex projections of the person are predicted based on the single 2D image. These predictions may be performed by one or more neural networks. Data of the 3D vertex projections include data of the 2D vertex projections.

In a step an approximate pose is estimated from the 3D vertex projections. The approximated pose does not equal to the exact real pose of the person. For instance, the approximated pose may be estimated by using a simple camera model. As mentioned above, such a simple camera model may be based on three parameters, namely two with respect to translations in the horizontal and vertical directions, and the third being scale.

A step of the method includes computing the shape and/or pose of the person from the predicted 2D vertex projections and from the approximated pose by using a pregiven (perspective) camera model and an articulated 3D mesh model of a human body. One or both of shape and pose may be computed in this way. The 2D vertex projections are less error prone than the predicted 3D vertex projections. Therefore, it is advantageous to base the computing of shape and/or pose on the predicted 2D vertex projections. For computing the final shape and/or pose the approximated pose based on the 3D vertex projection is used, but it is refined by using the pregiven (perspective) camera model. The pregiven camera model may model the camera used as exactly as possible. The more exact the model is, the more exact the shape and/or pose of the person will be computed. Beside the pregiven camera model an articulated 3D mesh model of a human body is used for computing the shape and/or pose. The 3D mesh model provides that the approximated pose will become more realistic. Thus, the shape and/or pose of the person may be computed more exactly on the basis of the predicted 2D vertex projections.

Embodiments provide reconstructing the 3D model from the shape/pose (that are the input parameters for a SMPL model). Thereby a camera model is incorporated during reconstruction.

In an embodiment, the computing of the pose and/or shape of the person includes computing rotations for individual segments of the human body. The individual segments represent limbs of the human body. The limbs may be rotated at respective joints. This knowledge simplifies the computation of pose and shape.

In an embodiment the pose parameters for the articulated 3D mesh model are obtained by inverse geometric transformation of the computed rotations. Specifically, the inverse geometric transformation may be performed by a so-called Pseudo-Linear-Inverse-Kinematic-Solver (PLIKS). Such PLIKS algorithm for 3D human shape and pose estimation may incorporate a perspective camera while solving for all the parameters of a parametric model analytically.

Furthermore, the computing of the pose of the person may include a translation of coordinates of the predicted 2D vertex projections into a pregiven coordinate system. Indeed, the person depicted in the 2D image has to be transformed into the real world, for example. Therefore, it may be necessary to translate the coordinates of the predicted 2D vertex projection into world coordinates or into other pregiven coordinate system. Such translation may allow for combining the reconstructed 3D mesh of the person with other objects in the real surroundings.

In an embodiment the articulated 3D mesh model are based on a system of linear equations. Such a system of linear equations is differentiable and allows for performing end-to-end training of a neural network. This means that intermediary algorithms may be omitted and directly learning the solution of a given problem from the sampled data set is possible. A further advantage of the system of linear equations is that constraints for obtaining the optimal canonical pose, shape and coordinate translation may be added.

In an embodiment a depth constraint is added to the system of linear equations. For example, an estimated depth from a camera prediction may be used to obtain a mesh in the world coordinate system. Further constraints related to the environment may be added.

In an embodiment, at least one further articulated 3D mesh model based on linear equations may be added to the systems of linear equations. Thus, there may be used a female mesh model, a male mesh model, a neutral mesh model, a lying mesh model (related to persons lying on a table for examinations) etc. One or more of these models may be provided for obtaining a proper reconstruction of the 3D mesh of a person.

Embodiments provide a device for reconstructing a 3D mesh of a person including an image delivery component for providing one single 2D image from the person, a prediction component for predicting 2D vertex projections and a 3D vertex projections of the person based on the single 2D image, an estimation component for estimating an approximated pose from the 3D vertex projections, and a calculation component for computing the shape and/or pose of the person from the predicted 2D vertex projections and from the approximated pose by using a pregiven camera model and an articulated 3D mesh model of a human body.

The image delivery component may be any device being possible to deliver image data, for example a memory, a camera or the like. Each of the prediction component, the estimation component, and/or the calculation component may include a computer or a processor for performing respective algorithms. All the components may also be included in one computing device.

The computing device or the above-mentioned component may each include a data processing device or a processor device configured to perform an embodiment of the method. The processor device may include at least one microprocessor and/or at least one microcontroller and/or at least one FPGA (field programmable gate array) and/or at least one DSP (digital signal processor). Furthermore, the processor device may include program code that is arranged to perform the embodiment of the method according to the invention when executed by the processor device. The program code may be stored in a data memory of the processor device. A processor circuit of the processor device may include, for example, at least one circuit board and/or at least one SoC (system on chip).

Embodiments further provide a computer program and a computer-readable (storage) medium including instructions that, when executed by a computer or a computer network, cause the computer or computer network to execute an embodiment of the method. The storage medium may, for example, be configured at least in part as a non-volatile data storage device (e.g., as a flash memory and/or as an SSD—solid state drive) and/or at least in part as a volatile data storage device (e.g., as a RAM—random access memory). However, the storage medium may also be operated, for example, as a so-called appstore server on the Internet. The computer or computer network may provide a processor circuit with at least one microprocessor. The instructions may be provided as binary code or assembler and/or as source code of a programming language (e.g., C).

Embodiments further include combinations of the features of the described embodiments. Embodiments encompass realizations each having a combination of the features of more than one of the described embodiments, provided that the embodiments have not been described as mutually exclusive.

For use cases or use situations that may arise in the method and that are not explicitly described here, it may be provided that, in accordance with the method, an error message and/or a prompt for user feedback is output and/or a default setting and/or a predetermined initial state is set.

DETAILED DESCRIPTION

Figure 1:
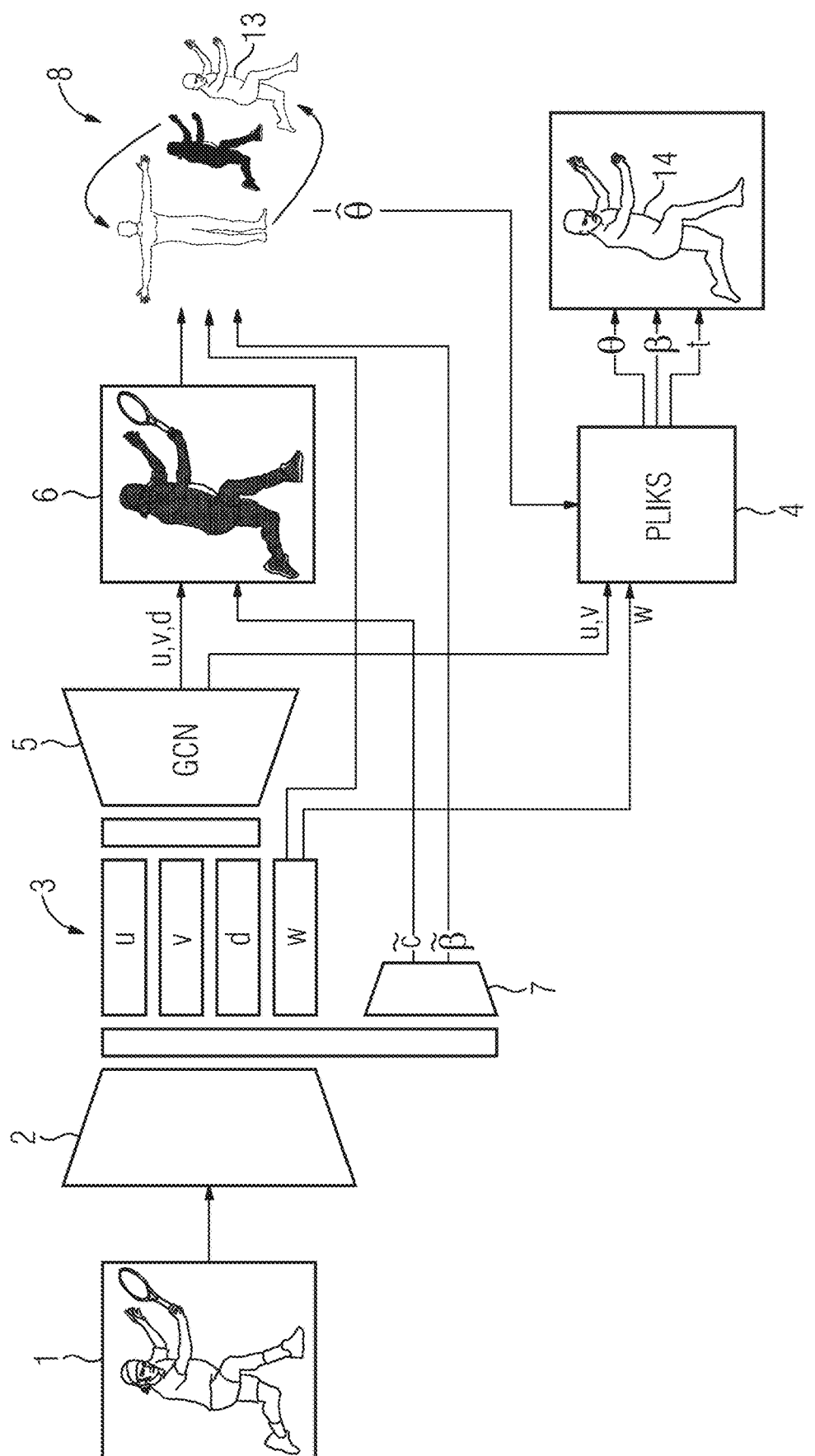
FIG. 1 depicts a diagram of an embodiment.

A novel approach named PLIKS (Pseudo-Linear-Inverse-Kinematic-Solver) is presented for 3D human shape and pose estimation that incorporates a perspective camera while solving for (all) parameters of a parametric model analytically. The pipeline of the approach includes in the embodiment according to FIG. 1 two essential modules, a mesh regressor 3 and PLIKS 4. The mesh regressor 3 provides a mapping between an image 1 and the 3D vertices of a parametric body model like the SMPL model. Given a single image, any typical CNN or encoder 2 may be used for feature extraction. The extracted features may be incorporated to obtain a mesh representation 6 either by using 1D CNNs, GraphCNNs (Graph Convolution Neural Network, short: GCN) 5 or even transformers. This way, correspondences to the image space may be found and a relative depth estimate d may be computed. In the context of mesh reconstruction Inverse Kinematics (IK) may be used. By applying IK, one may determine a set of optimal rotations mapping a deformed mesh 6 to a mesh in a template pose. From the image aligned mesh prediction rotations in canonical space may be estimated. The canonical space is the reference frame with respect to the mesh in a template pose. Specifically, the template SMPL requires relative rotations (i.e. canonical pose). In contrast: the phrase "world rotation/pose" means an absolute rotation required to move a joint/segment of the SMPL model for example.

Finally, the SMPL model may be reformulated as a linear system of equations, with which the 2D correspondences and any known camera intrinsic parameters may be used to fully estimate the model without the need of additional optimization. As the approach is end-to-end differentiable and fits the model within the training loop, it is self-improving in nature. The proposed approach is benchmarked against various 3D human pose and shape datasets, and significantly outperforms most of the previous state-of-the-art approaches.

The Skinned Multi-Person Linear 8 (SMPL) may be used to parameterize the human body. The SMPL model 8 is a statistical parametric function parameterized by shape $\beta$ and pose vectors (including relative rotation $\theta$). The output of this function is triangulated surface mesh with e.g., N=6890 vertices. The shape parameters $\beta$ are represented by a low dimensional principal component. The pose of the model is defined with the help of a kinematics chain involving a set of relative rotation vectors $\theta$ made up of e.g., 24 joints represented using axis-angle rotations. Additional model parameters represented as $\Phi$ are used in the deformation process of the SMPL model. Starting from a mean template mesh, the desired body mesh is obtained by applying forward kinematics based on the relative rotations $\theta$ and shape deformations $\beta$. The 3D body joints may be obtained by a linear combination of the mesh vertices using any desired linear regressor.

Solving the inverse kinematics (IK) from 2D correspondences is a challenging task due to the inherent non-linearity that exists in the parameterized mesh generation process. A linear system of equations of the form Ax=b is used. Constraints may be added to obtain an optimized pose $\theta^{\wedge}$, the shape $\beta$, and a (world) translation t (i.e., a translation into world coordinates). Linear-least-squares may be used to estimate the optimal parametric solution as it makes the entire pipeline end-to-end differentiable. From the world pose $\theta^{\wedge}$ the relative rotations $\theta$ (in the canonical space) may be inferred by recursively solving the kinematic tree in the PLIKS module 4. For the linear system, the rotations are assumed as a first order Taylor approximation, with individual segments of the predicted mesh model approximately oriented along the optimal solution, such that a single step may provide the exact solution.

Assuming that some form of dense vertex correspondences exist that maps a given input image to the mesh vertices on the image plane, the IK solver may be incorporated into the network. As shown in FIG. 1, the architecture includes the encoder 2, the mesh regressor 3 and a parameter regressor 7. The encoder 2 may be based on a human pose estimator HRNet-W32, parts of the mesh regressor may be inspired from Gyeongsik et al., whereas the parameter regressor may be a set of fully connected layers.

The encoder 2 may act as a feature extractor, with e.g., a channel dimension of C=480, height and width c=58, while taking a cropped image of a person as the input. 1D convolutions may be used to generate four feature vectors P={{Pu, Pv, Pd} and w} corresponding to the mesh vertices. Here, Pu and Pv resent the features on the u and v axis, Pd represents the features used for the root normalized depth and w the features for the weighting factor.

Then P~={Pu, Pv, Pd} are concatenated and processed using a graph convolution network 5 (GCN) to predict u, v and d. For the GCN 5 one may use the formulation from Kipf et al. Three GCNs may be used in series, with channel size 64, 32 and 3 respectively. The final output acts as the vertex correspondence in the image coordinate system.

The parameter regressor 7 may be a set of fully connected layers to obtain an approximate shape $\beta^{\sim}$ and a weak perspective camera c~, that are used to determine the approximate (world) rotations later. The estimated depth from the camera prediction may be used to obtain a mesh in the world coordinate system.

Though the SMPL model is intrinsically linear, it may not be defined as a linear system of equations to solve the IK due to the pose related shape deformations. To deal with this problem, a simplified model may be used, where the shape deformations are ignored in the formulation. The SMPL mesh may be split into e.g., 24 segments (each representing a part of a human body), that are considered to be rigid for the initial rotation estimations.

Given two sets of corresponding points in 3D space, it is possible to obtain an optimal rotation as a closed form solution using e.g., the Kabsch solver as Approximate Rotation Estimator (ARE). For a given segment from the network mesh prediction one may use the Kabsch solver to determine the rotation that a same segment from the template mesh needs to make from its rest pose. As the mesh prediction may represent a wide range of human shapes, ARE may make use of the shape predictions $\beta^{\sim}$ on the mean shape. The pose solver minimizes the squared distances between a set of 3D correspondences to obtain an optimal pose 13 as approximate world pose (as it does not take the camera into consideration).

The world rotation $\theta$ is obtained by applying singular value decomposition (SVD) over the covariance matrix. Since SVD is differentiable, gradients may be back-propagated during the training process. Due to the blend skinning process, a vertex may have rotation influence from one or more segments. To tackle this, the squared distances may be multiplied with a weight term.

The obtained rotations are in the world space, whereas the SMPL model expects relative rotations in its axis space. The root rotation determined around the pelvis corresponds to the global root rotation. The relative rotations for the other joints may be determined by the parent rotation following a pre-defined kinematic tree.

According to the PLIKS module (Pseudo-Linear-Inverse-Kinematic-Solver) 4 an accurate SMPL model may be projected onto the image plane, with no pose related blend shapes. Since the additional rotation required (from the approximated pose to the exact pose) is considered to be small one may linearize the model. Further simplifications of the projected SMPL model may be made, when assuming that the majority of the rotation is significantly affected by the rotation with respect to its primary segment, i.e., the impact of neighboring rotations may be ignored as they are minuscule. If the focal lengths and principal points are not known, a fixed focal length of e.g. 1000 mm and the image center as the principal point may be assumed.

Using Direct Linear Transform (DLT) a linear model in the form of Ax=b may be obtained. The optimal parameters may be obtained by minimizing the analytical error using linear least square. As the pseudo-inverse of the A matrix is differentiable, gradients an be back-propagated during the training process.

As a result a 3D mesh of the person may be obtained on the basis of the PLIKS outputs rotation θ, shape β and translation t.

The embodiments provide for: bridging the gap between the 2D correspondence and the parametric model by reformulating the model as linear system of equations. Since the proposed approach is differentiable, end-to-end training may be performed. The embodiments further provide a 3D human body estimation framework that reconstructs the 3D body without relying on weak-perspective assumptions. Embodiments further achieve at least state-of-the-art performance across various 3D human pose and shape benchmarks.

Figure 2:
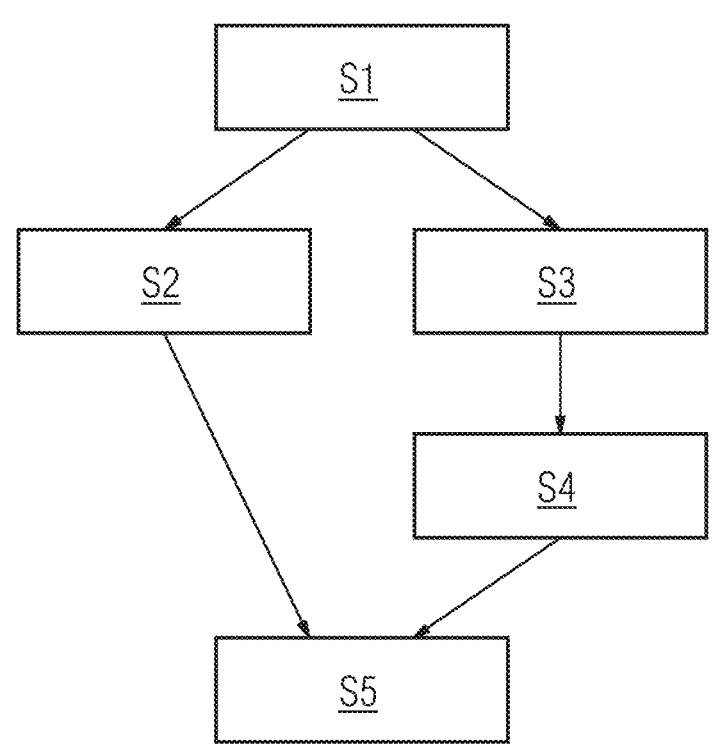
FIG. 2 depicts a schematic block diagram of a method according to an embodiment.

FIG. 2 depicts a block diagram of an embodiment of the method of reconstructing a 3D mesh of a person including several steps. In a first step S1 there is provided one single 2D image of the person. This 2D image is used for independent steps S2 and S3. In step S2 a 2D vertex projection of the person is predicted based on the single 2D image. In parallel 3D vertex projection of the person is predicted in step S3 based on the single 2D image. One of these predictions or both of them may be performed by a neural network.

In a step S4 the 3D vertex projections of step S3 are used for estimating an approximated pose 13 of the person. This estimation may be performed by a simplified camera model independent from the pregiven camera model used in the following step S5.

In step S5 the shape and/or pose of the person is computed from the 2D vertex projections predicted in step S2 and from the approximated pose 13 of step S4 by using the pregiven (perspective) camera model and an articulated 3D mesh model (SMPL) of a human body.

Figure 3:
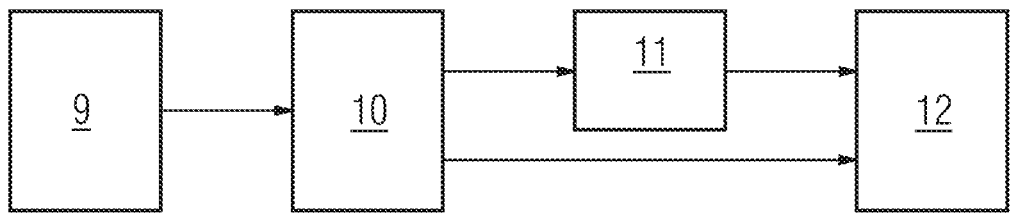
FIG. 3 depicts a schematic diagram of an embodiment of a device for reconstructing a 3D mesh of a person.

FIG. 3 depicts a principle diagram of an embodiment of the device for reconstructing a 3D mesh of a person. The device includes an image delivery component 9 for one single 2D image from the person. The image delivery component 9 may be a memory, a camera, a storage of the internet etc. Furthermore, the device includes prediction component 10 for predicting 2D vertex projections and 3D vertex projections of the person based on the single 2D image of the image delivery component 9. The device further includes estimation component 11 for estimating an approximated pose from the 3D vertex projections of the prediction component 10. Additionally, the device includes calculation component 12 for computing the shape and/or pose of the person from the predicted 2D vertex projections of prediction component 10 and from the approximated pose of estimation component 11 by using a pregiven (perspective) camera model and an articulated 3D mesh model of a human body.

The above-described embodiments have the advantages that any network used for predicting the 2D vertex projections and/or 3D vertex projections may be trained on a neutral model. Due to lack of gendered data (difficulty of collecting data in medical framework) a neutral model may be used. However, the neutral model may be replaced by any other gendered model or a specialized model, for example, a shape model for people lying on their back (patient during procedure) with no specialized data set or retraining.

A further advantage of the device or method is, that the depth resolution may be estimated better for the known camera intrinsic than other methods. Additionally, known constraints may be added to the model without any retraining or specialized data set. For example, a multiview geometry or a motion smoothing may be added. Furthermore, geometric conditions may be added if the position of the camera with respect to the table is known, for instance.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of reconstructing a 3D mesh of a person, the method comprising:
   providing a single 2D image of the person;
   predicting 2D vertex projections and 3D vertex projections of the person based on the single 2D image;
   estimating an approximated pose from the 3D vertex projections, and
   computing a shape, a pose, or the shape and the pose of the person from the predicted 2D vertex projections and from the approximated pose by using a pregiven camera model and an articulated 3D mesh model of a human body.

2. The method of claim 1, wherein computing includes computing rotations for individual segments of the human body.

3. The method of claim 2, wherein pose parameters for the articulated 3D mesh model are obtained by inverse geometric transformation of the computed rotations.

4. The method of claim 1, wherein computing includes a translation of coordinates of the predicted 2D vertex projections into a pregiven coordinate system.

5. The method of claim 1, wherein the articulated 3D mesh model bases on a system of linear equations.

6. The method of claim 5, wherein a depth constraint is added to the system of linear equations.

7. The method of claim 6, wherein at least one further articulated 3D mesh model based on linear equations is added to the system of linear equations.

8. A device for reconstructing a 3D mesh of a person, the device comprising:

an image delivery component configured to provide one single 2D image from the person;

a prediction component configured to predict 2D vertex projections and a 3D vertex projections of the person based on the single 2D image;

an estimation component configured to estimate an approximated pose from the 3D vertex projections; and a calculation component configured to compute a shape, a pose, or the shape and the pose of the person from the predicted 2D vertex projections and from the approximated pose by using a pregiven camera model and an articulated 3D mesh model of a human body.

9. The device of claim 8, wherein computing includes computing rotations for individual segments of the human body.

10. The device of claim 9, wherein pose parameters for the articulated 3D mesh model are obtained by inverse geometric transformation of the computed rotations.

11. The device of claim 8, wherein computing includes a translation of coordinates of the predicted 2D vertex projections into a pregiven coordinate system.

12. The device of claim 8, wherein the articulated 3D mesh model bases on a system of linear equations.

13. The device of claim 12, wherein a depth constraint is added to the system of linear equations.

14. The device of claim 13, wherein at least one further articulated 3D mesh model based on linear equations is added to the system of linear equations.

15. A non-transitory computer readable storage medium comprising a set of computer-readable instructions stored thereon, the instructions which, when executed by at least one processor cause the processor to:

provide a single 2D image of the person;

predict 2D vertex projections and 3D vertex projections of the person based on the single 2D image;

estimate an approximated pose from the 3D vertex projections, and compute a shape, a pose, or the shape and the pose of the person from the predicted 2D vertex projections and from the approximated pose by using a pregiven camera model and an articulated 3D mesh model of a human body.

16. The non-transitory computer readable storage medium of claim 15, wherein the instructions for the at least one processor to compute include computing rotations for individual segments of the human body.

17. The non-transitory computer readable storage medium of claim 16, wherein pose parameters for the articulated 3D mesh model are obtained by inverse geometric transformation of the computed rotations.

18. The non-transitory computer readable storage medium of claim 15, wherein the instructions for the at least one processor to compute include a translation of coordinates of the predicted 2D vertex projections into a pregiven coordinate system.

19. The non-transitory computer readable storage medium of claim 15, wherein the articulated 3D mesh model bases on a system of linear equations.

20. The non-transitory computer readable storage medium of claim 15, wherein a depth constraint is added to the system of linear equations.

* * * * *